(12) United States Patent
Gokavarapu et al.

(10) Patent No.: US 10,372,701 B2
(45) Date of Patent: Aug. 6, 2019

(54) TRANSACTION PROCESSOR

(71) Applicant: International Business Machines Corporation, Armonk, NY (US)

(72) Inventors: Nageswararao V. Gokavarapu, Bangalore (IN); John Kurian, Bangalore (IN); Jithesh Moothoor, Bangalore (IN); Raghavendran Srinivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 15/011,914

(22) Filed: Feb. 1, 2016

(65) Prior Publication Data

US 2017/0220624 A1 Aug. 3, 2017

(51) Int. Cl.
*G06F 16/23* (2019.01)
(52) U.S. Cl.
CPC ................... *G06F 16/2365* (2019.01)
(58) Field of Classification Search
CPC .......... G06F 11/1471; G06F 2201/80; G06F 11/2023; G06F 9/466; G06F 16/27; G06F 16/2379; G06F 16/23; G06F 2201/885; G06F 3/067; Y10S 707/99943; H04L 67/10
See application file for complete search history.

(56) References Cited

U.S. PATENT DOCUMENTS 7,730,489 B1 6/2010 Duvur et al.
9,110,851 B2 8/2015 Little et al.
2004/0158549 A1 8/2004 Matena et al.
2011/0161281 A1* 6/2011 Sayyaparaju ..... G06F 17/30377 707/607
2012/0095974 A1* 4/2012 Bentkofsky ....... G06F 17/30371 707/703
2016/0098697 A1* 4/2016 Dunsmore ............. G06Q 20/32 705/39
2016/0110403 A1* 4/2016 Lomet ............... G06F 17/30356 707/695

(Continued)

OTHER PUBLICATIONS

Oracle, "Achieving High Availability with Oracle Tuxedo," An Oracle White Paper, Jul. 2012, 19 pgs., http://www.oracla.com/technetwork/middleware/tuxedo/overview/tuxedo-ha-wp-2008-130747.pdf.

(Continued)

*Primary Examiner* — Yuk Ting Choi
(74) *Attorney, Agent, or Firm* — Erik K. Johnson

(57) ABSTRACT

An embodiment of the invention may include a method, computer program product and system for processing a transaction. The embodiment may include receiving a transaction request by a first transaction processing monitor from a plurality of transaction processing monitors. The transaction request contains details for updating a global database. The embodiment may include determining whether the global database has begun updating based on the transaction request. Determining whether the global database has begun updating includes checking a transaction state database. The embodiment may include determining that the global database has not begun updating, and updating an entry in the global database based on the details contained in the transaction request.

14 Claims, 4 Drawing Sheets

(56) References Cited

U.S. PATENT DOCUMENTS

| | | | | |
|---|---|---|---|---|
| 2016/0180341 A1* | 6/2016 | Garlick | ............ | G06Q 20/4016 |
| | | | | 705/44 |
| 2017/0147640 A1* | 5/2017 | Gaza | ................ | G06F 16/24542 |
| | | | | 707/999.003 |
| 2017/0177697 A1* | 6/2017 | Lee | .................. | G06F 17/30581 |
| | | | | 707/607 |

OTHER PUBLICATIONS

IBM, "Using WebSphere MQ with high availability configurations," http://www-01.ibm.com/support/knowledgecenter/SSFKSJ_7.5.0/com.ibm.mq.con.doc/q017820__.htm, 3 pgs, printed Jan. 28, 2016 4:16 PM.

* cited by examiner

TRANSACTION PROCESSOR

BACKGROUND

The present invention relates to transaction processing, and more particularly to allocating work to transaction processing monitors.

A transaction can be defined as a change in state of a system where the change state confirms to the ACID (Atomicity, Concurrence, Isolation and Durability) properties. A Transaction manager is a software that ensures transactionality in a business transaction environment. Typically transaction managers control millions of real time electronic transactions that happen in a day throughout the world. Hence, the transaction managers are required to be highly available and also execute transactions with a fast response time. Transaction managers are usually deployed in stock exchanges, reservation systems, insurance systems and other systems where the business data being handled is critical.

It is a common scenario to use a workload manager or a disaster recovery mechanism to provide high availability in the transaction processing environment. In Transaction Processing Monitor (TPM) such as IBM® CICS®, the workload manager achieves high availability by routing a request to one of the application owning region capable of servicing the transaction request. A region in a CICS® environment is an independent instance of TPM providing transaction services. In case of any failure in one of the application owning region, the subsequent requests are sent to an available application owning region capable of handling the request. In a real world situations, a single TPM instance handle hundreds or even thousands of concurrent transaction requests.

BRIEF SUMMARY

An embodiment of the invention may include a method, computer program product and system for processing a transaction. The embodiment may include receiving a transaction request by a first transaction processing monitor from a plurality of transaction processing monitors. The transaction request contains details for updating a global database. The embodiment may include determining whether the global database has begun updating based on the transaction request. Determining whether the global database has begun updating includes checking a transaction state database. The embodiment may include determining that the global database has not begun updating, and updating an entry in the global database based on the details contained in the transaction request.

DETAILED DESCRIPTION

Embodiments of the present invention will now be described in detail with reference to the accompanying Figures.

Figure 1:
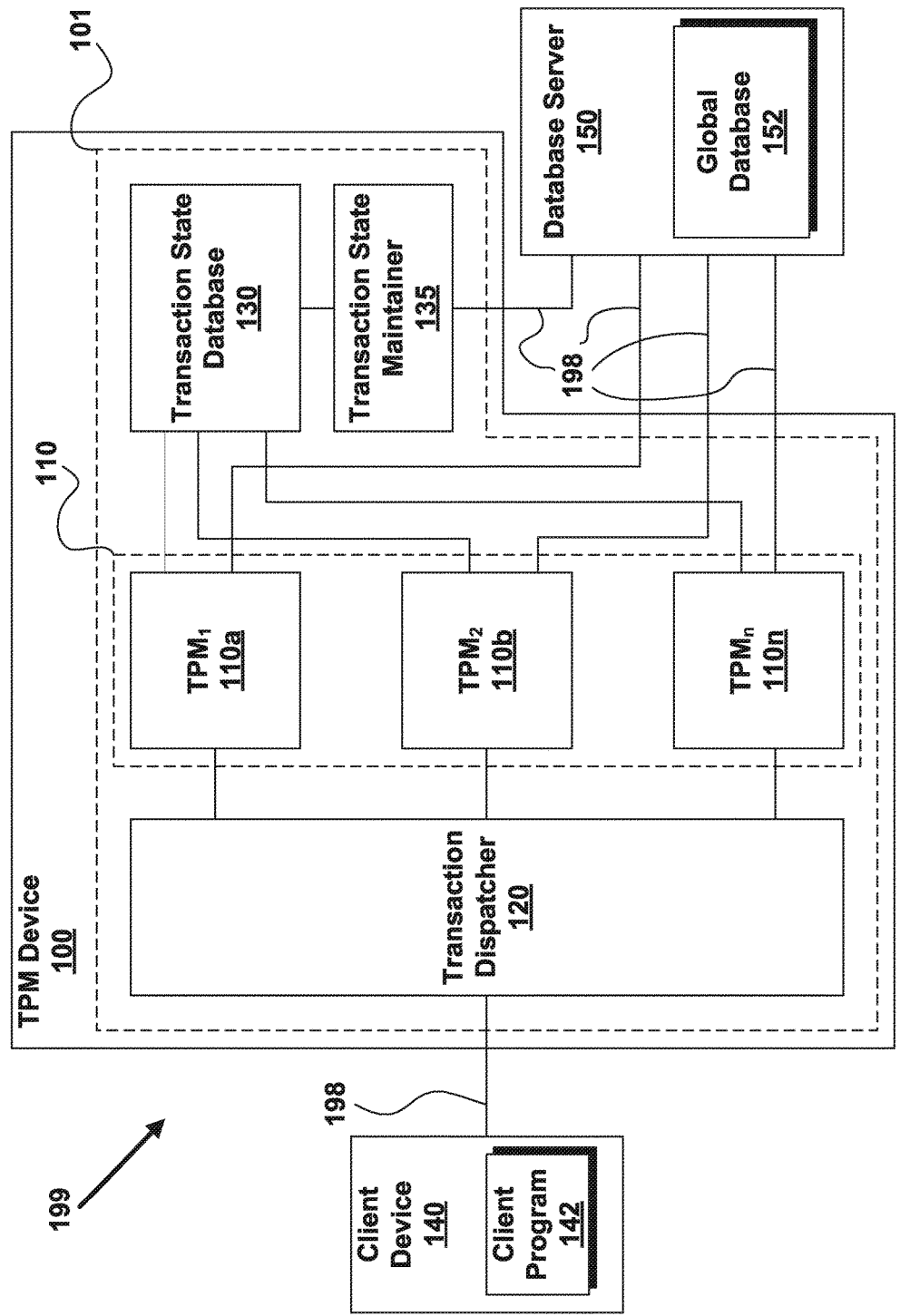
FIG. 1 illustrates a transaction system, in accordance with an embodiment of the invention.

FIG. 1 illustrates transaction system 199, in accordance with an embodiment of the invention. In an example embodiment, transaction system 199 includes a transaction process monitor device 100, a client device 140 and a database server 150 interconnected via a network 198.

In the example embodiment, network 198 is the Internet, representing a worldwide collection of networks and gateways to support communications between devices connected to the Internet. Network 198 may include, for example, wired, wireless or fiber optic connections. In other embodiments, network 198 may be implemented as an intranet, a local area network (LAN), or a wide area network (WAN). In general, network 198 can be any combination of connections and protocols that will support communications between the transaction process monitor device 100 and the client device 140, or transaction process monitor device 100 and the database server.

Client device 140 may include a client program 142. Client device 140 may be a desktop computer, a notebook, a laptop computer, a tablet computer, a handheld device, a smart-phone, a thin client, or any other electronic device or computing system capable of initiating a transaction via network 198. Although not shown, optionally, client device 140 can comprise a cluster of web servers executing the same software to collectively initiates millions of transactions per second. Client device 140 is described in more detail with reference to FIG. 4.

Client program 142 is a program is capable of initiating a transaction that can be received by transaction process monitor 101. The transaction may be a change in state of a system where the change state confirms to the ACID (Atomicity, Concurrence, Isolation and Durability) properties. For example, a transaction may be a commercial transaction (e.g. credit card purchase), a financial transaction (e.g. stock purchase), reservation, or any other applicable transaction.

Database server 150 includes global database 152. In the example embodiment, database server 150 is a desktop computer, a notebook, a laptop computer or a thin client, or any other electronic device or computing system capable of receiving and storing the data contained in global database 152. Although not shown, database server 150 may be a cluster of servers executing the same software to collectively receive and store millions of transactions per second. Database server 150 is described in more detail with reference to FIG. 4. Global database 152 may be a collection of data detailing transactions (in some cases millions of transactions).

Transaction process monitor device 100 includes transaction process monitor 101. In the example embodiment, transaction process monitor device 100 is a desktop computer, a notebook, a laptop computer or a thin client, or any other electronic device or computing system capable of managing an update to the global database 152 based on a transaction initiated from the client program 142 via network 198. Although not shown, transaction process monitor device 100 may be a cluster of servers executing the same software to collectively receive and process millions of transactions per second. Transaction process monitor device 100 is described in more detail with reference to FIG. 4.

Transaction process monitor 101 is a collection of modules that receive the transaction a transaction from client program 142 and update the global database 152. Transaction process monitor 101 includes transaction dispatcher 120, Transaction Processing Monitor (TPM) instances 110, transaction state database 130 and transaction state maintainer 135. Operation and functions of transaction process monitor 101 are described in further detail below, with regard to the flowchart depicted in FIG. 2.

Transaction Dispatcher 120 is a module of transaction process monitor 101. Transaction dispatcher 120 receives a transaction from client program 142, via network 198. When the transaction is received, transaction dispatcher 120 assigns the transaction with a unique transaction identifier (UTID). The transaction dispatcher 120 then transmits the transaction to more than one instance of TPM instances 110, and additionally sends the UTID and the number of TPM instances 110 the transaction was sent to as metadata associated with the transaction request, in order to coordinate the processing of the transaction.

Transaction state database 130 contains information detailing the status of the transactions being managed by transaction process monitor 101. In one embodiment, the transaction state database 130 has an entry for each active UTID, as well as information detailing the status of the transaction (i.e. in progress, completed, failed), the number of TPM instances the transaction was sent to, the number of TPM instances currently working to process the transaction, the TPM instance currently attempting to execute the task, and the recovery point achieved during the update of global database 152, if any, of the transaction.

Transaction state maintainer 135 updates and removes entries in transaction state database 130. Transaction state maintainer 135 updates transaction state database 130 based on the failure of the instance of TPM instances 110 that was transmitting the transaction to the global database 152. Transaction state maintainer 135 does this by monitoring the instance, and changing the status of the transaction for the UTID in the transaction state database after detecting that the instance of the TPM instances 110 executing the transaction has failed to complete. Additionally, transaction state maintainer 135 removes entries from the transaction state database 130 when there are no longer any TPM instances attempting to execute the task.

TPM instances 110 receives the details of a transaction from 120 and attempts to execute the transaction by updating the global database 152 with the relevant information from the transaction. TPM instances 110 may include multiples TPM instances, such as $TPM_1$ instance 110a, $TPM_2$ instance 110b, and $TPM_n$ instance 110n, that simultaneously receive the transaction and work in a coordinated manner to process the transaction. The transaction is first processed by the fastest responding instance. If the transaction fails, concurrent instances proceed from the last recoverable position that was achieved by the failed instance. The operations and functions of each instance of TPM instances 110 are described in further detail below with regard to FIG. 3.

Figure 2:
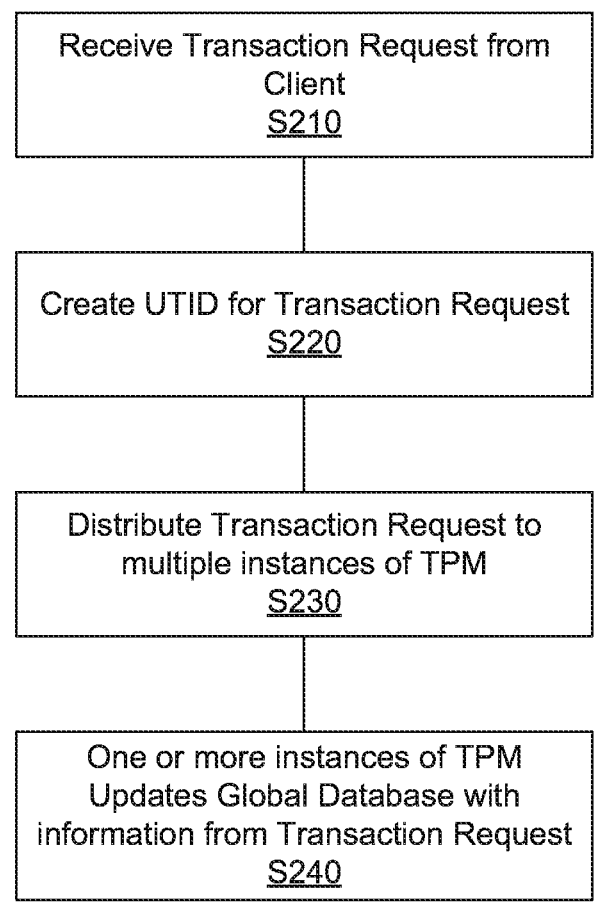
FIG. 2 is a flowchart illustrating the operations of the transaction system of FIG. 1, in accordance with an embodiment of the invention.

FIG. 2 is a flow chart illustrating transaction process monitor 101 of FIG. 1. With regards to step S210, the transaction dispatcher 120 of the transaction process monitor 101 receives a transaction request from client device 140, via network 198, containing information detailing a transaction which is to be executed resulting in an update to global database 152. The transaction may contain a transaction ID from the client, as well as other data detailing the transaction.

With regards to step S220, the transaction dispatcher 120 of the transaction process monitor 101 assigns the incoming transaction with a unique transaction ID (UTID). The UTID is used by the transaction process monitor 101 during the processing of the transaction to act as a unique identifier of the job to be performed, in order to coordinate actions across multiple processes. The UTID may be contained in metadata associated with the transaction, and used by the transaction process monitor 101.

With regards to step S230, transaction dispatcher 120 distributes the transaction request to multiple instances of TPM instances 110. The number of instances that the transaction request is sent to may be a configurable parameter chosen based on the failure rate of a single TPM instance to perform the required tasks, the required reliability rate for the transaction process monitor, or processing constraints. In one example, the lower bound of the number of instances may be selected by determining the n number of instances necessary to ensure a reliability rate above a certain set point, whereby the reliability rate may be determined using the equation reliability rate=$1-(\text{failure rate})^n$. In an example embodiment, failure rates may be determined using historical data of previous transactions, as well as any relevant operating parameters. In another example, the upper bound of the number of instances may account for the memory requirements of increasing the n number of instances for every transaction processed, and determining if it exceeds the total memory for the transaction process monitor device 100, or alternatively determining a point in which the additional memory or processing requirements leads to an increase in the failure rate of a TPM instance.

With regards to step S240, TPM instances 110 updates the global database 152 with information from the transaction request. Each instance of TPM instances 110 follows the method set forth in FIG. 3 in updating the global database 152.

Figure 3:
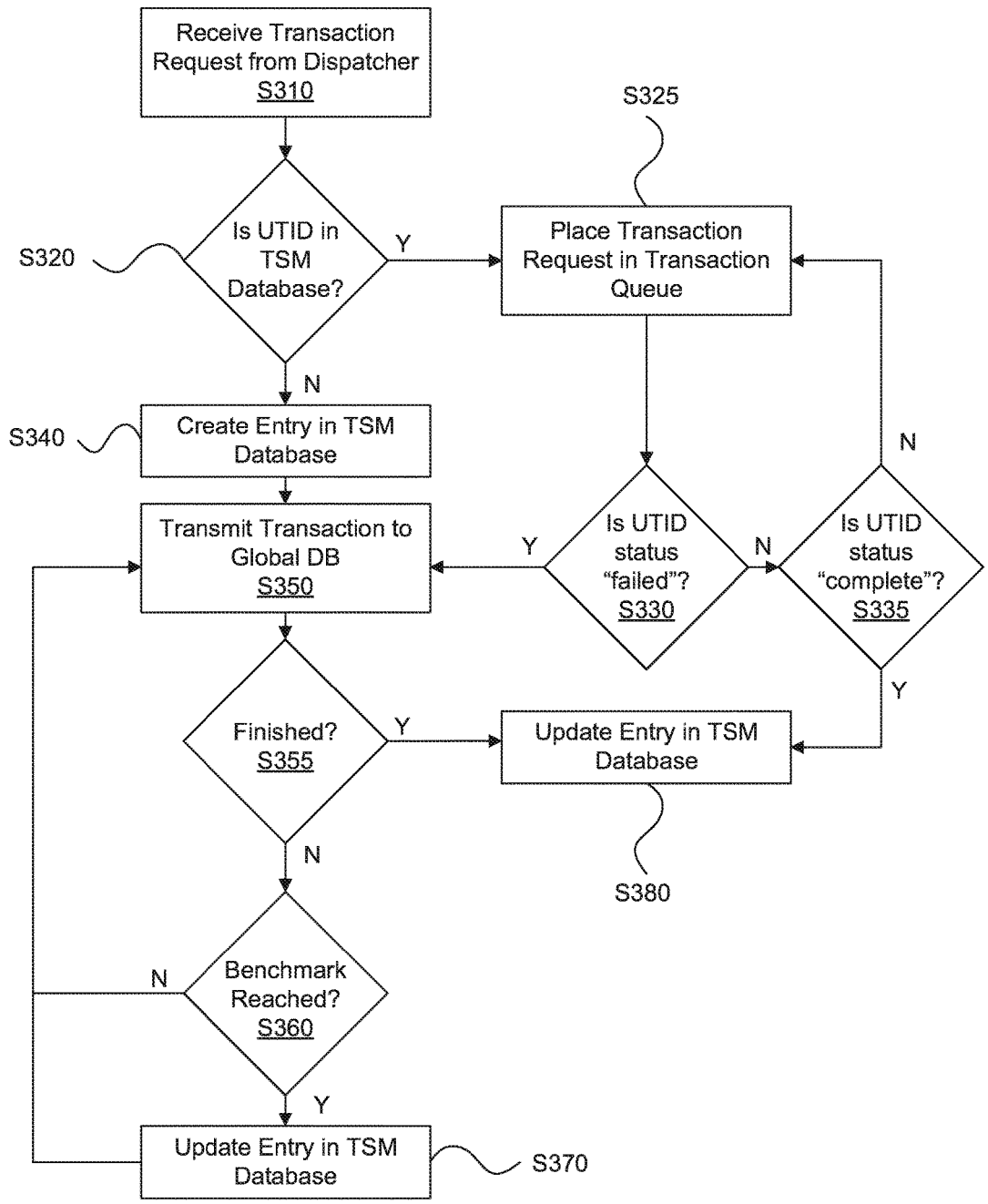
FIG. 3 is a flowchart illustrating the operations of an instance of the transaction process monitor of FIG. 1, in accordance with an embodiment of the invention.

FIG. 3 is a flowchart depicting the operation of a single instance of TPM instances 110, such as $TPM_1$ instance 110a, $TPM_2$ instance 110b, or $TPM_n$ instance 110n. $TPM_n$ instance 110n will be referenced when discussing the steps of FIG. 3, however it should be noted that $TPM_1$ instance 110a, $TPM_2$ instance 110b, and all other single instances of TPM instances 110, would follow the same steps. With regards to step S310, as discussed above, $TPM_n$ instance 110n receives a transaction request from transaction dispatcher 120. The transaction contains a UTID created by the transaction dispatcher 120, as well as all of the information provided by client program 142, which allows $TPM_n$ instance 110n to coordinate and complete processing the transaction.

With regards to step S320, $TPM_n$ instance 110n determines if a transaction containing the same UTID as the current transaction is contained in the transaction state database 130. If the UTID already exists in the transaction state database 130, it signals that a different instance of TPM instances 110 started the transaction before $TPM_n$ instance 110n. If the UTID exists in the transaction state database 130, $TPM_n$ instance 110n proceeds to step S325. If the UTID does not exist in the transaction state database 130, $TPM_n$ instance 110n proceeds to step S340.

With regards to step S340, $TPM_n$ instance 110n creates an entry in the transaction state database 130. The entry contains the UTID, as well as information detailing the processing of the transaction, such as, for example, the number of TPM instances that the transaction was sent to, the name of the TPM executing the task and the status of the transaction.

With regards to step S325, $TPM_n$ instance 110n places the transaction request in a transaction queue. The transaction queue may be a list of transactions that are not currently being performed by $TPM_n$ instance 110n, but have not completed processing. Placing the transaction request in the transaction queue maintains the transaction until it is confirmed that the transaction is completed.

With regards to step S330, $TPM_n$ instance $110n$ removes the transaction request from the transaction queue and checks the status of the UTID in the transaction state database 130 and determines if the status is "failed." The "failed" status is determined by communicating with the transaction state maintainer 135, via updating transaction state database 130, through periodic monitoring of each transaction processed into the global database 152. The transaction state maintainer 135 determines the status by sending a request on the operating status of either the TPM instance $110n$ or the status for a specific UTID, and receiving a status "running" or status "null" from the global database 152. If the status is "running," then the transaction is "in progress" and the transaction state maintainer 135 updates the status in the transaction state database 130. If the status is null, transaction state maintainer 135 determines that processing the transaction for a specific UTID has failed, and updates the status of the transaction in the transaction state database 130. If the status of the transaction corresponding to the UTID is "failed," $TPM_n$ instance $110n$ proceeds to step S350. If the status of the transaction corresponding to the UTID is not "failed," $TPM_n$ instance $110n$ proceeds to step S335.

With regards to step S335, $TPM_n$ instance $110n$ determines if the status of the transaction is complete. In an embodiment $TPM_n$ instance $110n$ determines if the status is complete by checking if the number of operating TPM instances associated with the UTID is less than the number of TPM instances the transaction request was originally sent to by the transaction dispatcher 120 for the particular UTID. In another embodiment, the status of the transaction may be identified as complete. If the status of the transaction corresponding to the UTID is complete $TPM_n$ instance $110n$ proceeds to step S380. If the status of the transaction corresponding to the UTID is not complete, $TPM_n$ instance $110n$ proceeds to step S325.

With regards to step S350, $TPM_n$ instance $110n$ updates the global database 152 with the details of the transaction request. The details of the transaction may be all of the details received by the client program 142, and intended to be inserted into the global database 152.

With regards to step S355, $TPM_n$ instance $110n$ determines if transmission of the transaction is finished. This may occur when all of the information received from the client program 152, and is required to update the global database 152, is inserted into the global database 152. Upon finishing processing the transaction, information detailing the completion of the insertion of the transaction into the global database 152 is sent back to client program 142. If the transaction is finished, $TPM_n$ instance $110n$ proceeds to step S355. If the transaction is not finished, $TPM_n$ instance $110n$ proceeds to step S360.

With regards to step S360, $TPM_n$ instance $110n$ determines if transmission of the transaction has reached a recoverable benchmark. A recoverable benchmark may be any point in the transmission of the transaction where, if the transaction were to subsequently fail, a different TPM instance could restart the transmission from the recoverable benchmark without causing errors. For example, XA Unique Identifier (XID) values may be stored as the benchmark, and may represent a discrete segment of a transaction that has been completed. If the transaction has reached a benchmark, $TPM_n$ instance $110n$ proceeds to step S370. If the transaction has not reached a benchmark, $TPM_n$ instance $110n$ proceeds to step S350.

With regards to step S370, $TPM_n$ instance $110n$ updates the entry in the transaction state database 130. $TPM_n$ instance $110n$ updates the entry to signify the last benchmark reached during transmission of the transaction, which may allow for retrieval if $TPM_n$ instance $110n$ were to stop operation during transmission of the transaction. This may allow for a different TPM instance to continue transmitting the transaction from the last benchmark achieved.

With regards to step S380, $TPM_n$ instance $110n$ updates the entry in the transaction state database 130. In one embodiment, $TPM_n$ instance $110n$ updates the field describing the number of TPM instances operating to be one less. This may alert other TPM instances that the transmission of the transaction to the global database 152 has completed. Additionally, when the number of TPM instances reaches 0, this may signal to the transaction state maintainer 135 to clean up, or delete, the entry since the transaction has completed. In other embodiments, the $TPM_n$ instance $110n$ updates the field describing the current state of the UTID as complete.

Figure 4:
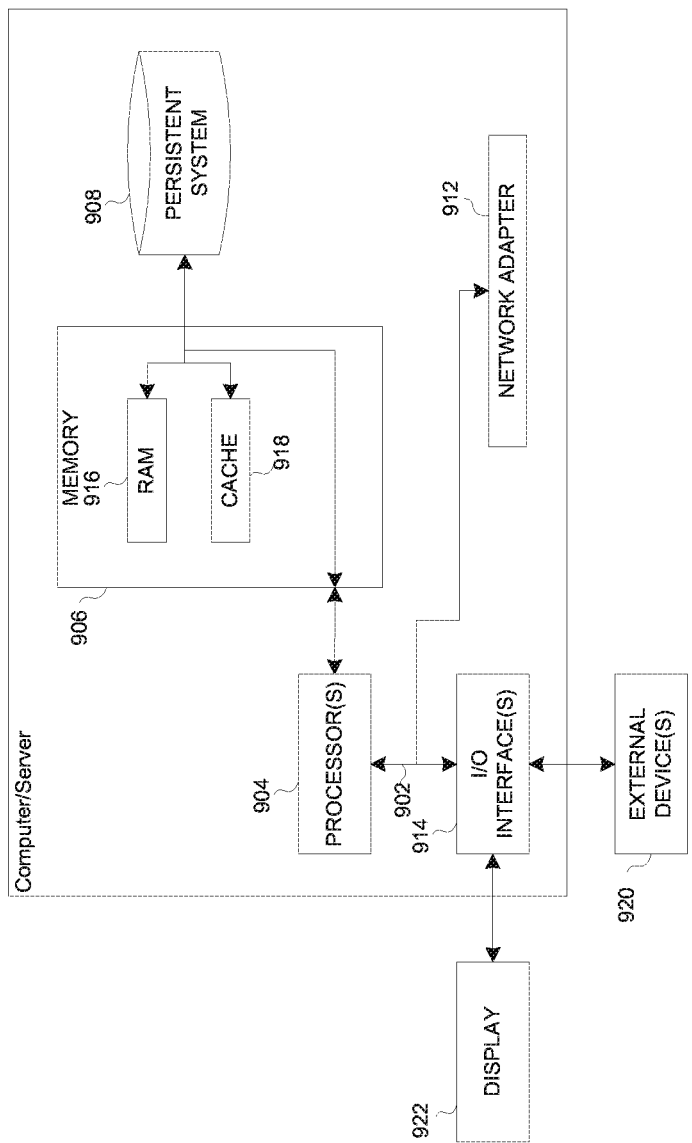
FIG. 4 is a block diagram depicting the hardware components of the transaction system of FIG. 1, in accordance with an embodiment of the invention.

FIG. 4 depicts a block diagram of components of a transaction process monitor device 100, a client device 140 and a database server 150, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

A transaction process monitor device 100, a client device 140 and a database server 150 include communications fabric 902, which provides communications between computer processor(s) 904, memory 906, persistent storage 908, communications unit 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs transaction process monitor 101 in transaction process monitor device 100; client program 142 in client device 140, and global database 152 in database server 150 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Communications unit 912, in these examples, provides for communications with other data processing systems or devices. In these examples, communications unit 912 includes one or more network interface cards. Communications unit 912 may provide communications through the use of either or both physical and wireless communications links. The programs transaction process monitor 101 in transaction process monitor device 100; client program 142 in client device 140, and global database 152 in database server 150 may be downloaded to persistent storage 908 through communications unit 912.

I/O interface(s) 914 allows for input and output of data with other devices that may be connected to transaction process monitor device 100 and client device 140. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., the programs transaction process monitor 101 in transaction process monitor device 100; client program 142 in client device 140, and global database 152 in database server 150 may be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for processing a transaction, the method comprising:

receiving a plurality of transaction request by multiple instances of transaction processing monitors, wherein each transaction request comprises details for updating a global database, and wherein each transaction request is simultaneously received by the multiple instances of transaction processing monitors and identical to the other transaction requests of the plurality of transaction requests;

determining, by a first transaction processing monitor of the multiple instances of transaction processing monitors when the transaction request in a queue of the transaction processing monitor, that a Unique Transaction Identifier(UTID) for a first transaction request is in a transaction state database;

based on determining, by the first transaction processing monitor, that the UTID for the first transaction request is in the transaction state database, placing the first transaction request in a queue by each transaction processing monitor in an order in which it was received by the transaction processing monitor and receiving a second transaction request and determining whether a UTID for the second transaction request is in the transaction state database based on determining that the global database has not begun updating the second transaction request, updating, by the first transaction processing monitor, an entry in the global database based on the details contained in the second transaction request and creating an entry based on the UTID for the second transaction request in the transaction state database, wherein the entry further comprises a status of the second transaction, and wherein the transaction status in the transaction state database is updated by a transaction state maintainer monitoring the update to the global database.

2. The method of claim 1, further comprising:
based on updating the global database with the second transaction request, checking a status of the first transaction request in the transaction state database.

3. The method of claim 2, based on determining a failed status of the first transaction request in the transaction state database, updating, by the first transaction processing monitor, the entry in the global database, wherein updating the entry in the global database further comprises:

receiving information from the transaction state database detailing a benchmark reached in a previous update of the global database; and updating the entry in the global database starting from the benchmark reached during the previous update.

4. The method of claim 2, further comprising based on determining a not-failed status of the first transaction request in the transaction state database, proceeding to a third transaction request.

5. The method of claim 1, wherein the entry in the transaction state database comprises information pertaining to one or more of: a status of transaction processing, a number of transaction processing monitors, and a name of the transaction processing monitor updating the entry in the global database.

6. A computer program product for processing a transaction, the computer program product comprising:

one or more computer-readable storage devices and program instructions stored on at least one of the one or more tangible storage devices, the program instructions comprising:

program instructions to receive a plurality of transaction request by multiple instances of transaction processing monitors, wherein each transaction request comprises details for updating a global database, and wherein each transaction request is simultaneously received by the multiple instances of transaction processing monitors and identical to the other transaction requests of the plurality of transaction requests;

program instructions to determine, by a first transaction processing monitor of the multiple instances of transaction processing monitors when the transaction request in a queue of the transaction processing monitor, that a Unique Transaction Identifier(UTID) for a first transaction request is in a transaction state database;

based on determining, by the first transaction processing monitor, that the UTID for the first transaction request is in the transaction state database, placing the first transaction request in a queue by each transaction processing monitor in an order in which it was received by the transaction processing monitor and receiving a second transaction request and determining whether a UTID for the second transaction request is in the transaction state database;

based on determining that the global database has not begun updating the second transaction request, program instructions to update, by the first transaction processing monitor, an entry in the global database based on the details contained in the second transaction request and creating an entry in the transaction state database based on the UTID for the second transaction request, wherein the entry further comprises a status of the second transaction, and wherein the transaction status in the transaction state database is updated by a transaction state maintainer monitoring the update to the global database.

7. The computer program product of claim 6, further comprising:

based on updating the global database with the second transaction request, program instructions to check a status of the first transaction request in the transaction state database.

8. The computer program product of claim 7, based on determining a failed status of the first transaction request in the transaction state database, program instructions to update, by the first transaction processing monitor, the entry in the global database, wherein the program instructions to update the entry in the global database further comprises:

program instructions to receive information from the transaction state database detailing a benchmark reached in a previous update of the global database; and program instructions to update the entry in the global database starting from the benchmark reached during the previous update.

9. The computer program product of claim 7, further comprising based on determining a not-failed status of the first transaction request in the transaction state database, program instructions to proceed to a third transaction request.

10. The computer program product of claim 6, wherein the entry in the transaction state database comprises information pertaining to one or more of: a status of transaction processing, a number of transaction processing monitors, and a name of the transaction processing monitor updating the entry in the global database.

11. A computer system for processing a transaction, the computer system comprising:

one or more processors, one or more computer-readable memories, one or more computer-readable storage devices, and program instructions stored on at least one of the one or more storage devices for execution by at least one of the one or more processors via at least one of the one or more memories, the program instructions comprising:

program instructions to receive a plurality of transaction requests by multiple instances of transaction processing monitors, wherein the transaction request comprises details for updating a global database, and wherein each transaction request is simultaneously received by the multiple instances of transaction processing monitors and identical to the other transaction requests of the plurality of transaction requests;

program instructions to determine, by a first transaction processing monitor of the multiple instances of transaction processing monitors when the transaction request in a queue of the transaction processing monitor, that a Unique Transaction Identifier(UTID) for a first transaction request is in a transaction state database;

based on determining, by the first transaction processing monitor, that the UTID for the first transaction request is in the transaction state database, placing the first transaction request in a queue by each transaction processing monitor in an order in which it was received by the transaction processing monitor and receiving a second transaction request and determining whether a UTID for the second transaction request is in the transaction state database based on determining that the global database has not begun updating the second transaction request, program instructions to update, by the first transaction processing monitor, an entry in the global database based on the details contained in the second transaction request and creating an entry in the transaction state database based on the UTID for the second transaction request, wherein the entry further comprises a status of the second transaction, and wherein the transaction status in the transaction state database is updated by a transaction state maintainer monitoring the update to the global database.

12. The computer system of claim 11, further comprising:

based on updating the global database with the second transaction request, program instructions to check a status of the first transaction request in the transaction state database.

13. The computer system of claim 12, based on determining a failed status of the first transaction request in the transaction state database, program instructions to update, by the first transaction processing monitor, the entry in the global database, wherein the program instructions to update the entry in the global database further comprises:

program instructions to receive information from the transaction state database detailing a benchmark reached in a previous update of the global database; and program instructions to update the entry in the global database starting from the benchmark reached during the previous update.

14. The computer system of claim 12, further comprising based on determining a not-failed status of the first transaction request in the transaction state database, program instructions to proceed to a third transaction request.

* * * * *